(12) United States Patent
Agata

(10) Patent No.: US 6,960,386 B2
(45) Date of Patent: Nov. 1, 2005

(54) HOLDING/SEALING MATERIAL FOR USE IN CATALYTIC CONVERTER FOR CLARIFYING GASEOUS EMISSION

(75) Inventor: Masanao Agata, Gifu-ken (JP)

(73) Assignee: Ibiden Co., Ltd., Ogaki (JP)

( * ) Notice: Subject to any disclaimer, the term of this patent is extended or adjusted under 35 U.S.C. 154(b) by 365 days.

(21) Appl. No.: 10/312,084

(22) PCT Filed: Jun. 19, 2001

(86) PCT No.: PCT/JP01/05233
§ 371 (c)(1),
(2), (4) Date: Dec. 23, 2002

(87) PCT Pub. No.: WO01/98640
PCT Pub. Date: Dec. 27, 2001

(65) Prior Publication Data
US 2003/0104189 A1 Jun. 5, 2003

(30) Foreign Application Priority Data
Jun. 21, 2000 (JP) ................................. 2000-186406

(51) Int. Cl.⁷ ............................................. B32B 5/16
(52) U.S. Cl. .................... 428/323; 428/87; 428/105; 428/312.2; 428/318.8; 428/113; 428/340; 428/364; 29/890
(58) Field of Search ............ 428/87, 105, 107, 428/113, 206, 312.2, 318.8, 340, 323, 364, 116, 593, 594, 137, 51, 311.51, 312.6; 29/890; 422/177, 179, 180

(56) References Cited

U.S. PATENT DOCUMENTS

| | | | | |
|---|---|---|---|---|
| 4,911,227 A | * | 3/1990 | Saito et al. ..................... 165/10 |
| 5,376,341 A | * | 12/1994 | Gulati ......................... 422/179 |
| 5,686,039 A | * | 11/1997 | Merry .......................... 264/259 |
| 5,996,228 A | * | 12/1999 | Shoji et al. .................... 29/890 |
| 6,231,818 B1 | * | 5/2001 | TenEyck ...................... 422/179 |
| 6,589,488 B1 | * | 7/2003 | Eyhorn ........................ 422/179 |

FOREIGN PATENT DOCUMENTS

| EP | 0 192 417 | 8/1986 |
|---|---|---|
| JP | 59-519 | 1/1984 |
| JP | 1-190910 | 8/1989 |
| JP | 2000-136717 | 5/2000 |
| JP | 2000-161050 | 6/2000 |

* cited by examiner

Primary Examiner—Merrick Dixon
(74) Attorney, Agent, or Firm—Oblon, Spivak, McClelland, Maier & Neustadt, P.C.

(57) ABSTRACT

An object of the invention is to provide a holding and sealing mat material of a catalytic converter for purifying an exhaust gas which can prevent inorganic fibers from flying in all directions from a surface of the holding and sealing mat material, and can keep a working environment at a time of assembling good. In the holding and sealing mat material of a catalytic converter for purifying an exhaust gas, which is arranged between a catalyst carrier and a shell covering the catalyst carrier from the outside thereof, the holding and sealing mat material includes a mat-like material consisting of inorganic fibers and being formed in a mat shape and a binder of 0.5 to 20 weight % of an organic binder or an inorganic binder, which is attached to the mat-like material, wherein a filling bulk density of the holding and sealing mat material after being assembled is within a range between 0.1 and 0.6 g/cm³, and wherein in the case of estimating distribution rates of solids constituents in the binder attached to the mat-like material by dividing the mat-like material into three equal parts of an upper portion, a middle portion and a lower portion in a thickness direction, the distribution rates of the upper portion and the lower portion are higher than that of the middle portion.

8 Claims, 6 Drawing Sheets

HOLDING/SEALING MATERIAL FOR USE IN CATALYTIC CONVERTER FOR CLARIFYING GASEOUS EMISSION

TECHNICAL FIELD

The present invention relates to a catalytic converter for purifying an exhaust gas which purifies the exhaust gas discharged from an engine such as an internal combustion engine or the like, and more particularly to a holding and sealing mat material thereof.

BACKGROUND ART

As shown in FIG. 6, conventionally, a catalytic converter 90 for purifying an exhaust gas is used for purifying an exhaust gas discharged from an engine 92 such as an internal combustion engine or the like. The catalytic converter 90 for purifying an exhaust gas has a catalyst carrier 1, a metal shell 95 which covers an outer portion thereof and a holding and sealing mat material 91 which is arranged between the both. The holding and sealing mat material 91 can prevent the exhaust gas from leaking out from a portion between the catalyst carrier 1 and the shell 95, and it is possible to prevent the catalyst carrier 1 from being damaged by being in contact with the shell 95.

Further, at a time of manufacturing the catalytic converter 90 for purifying an exhaust gas, the holding and sealing mat material 91 is wound around the catalyst carrier 1, and an integrally wound product is arranged in an inner portion of the shell 95. Then, an inlet connection portion 97 and an outlet connection portion 98 are respectively connected to both ends of the shell 95 by a welding process. The catalytic converter 90 for purifying an exhaust gas manufactured in the manner mentioned above is arranged in the middle of a pipe 99 for an exhaust gas discharged from the engine 92.

However, the holding and sealing mat material 91 of the catalytic converter 90 for purifying an exhaust gas in accordance with the conventional art has the following problems.

That is, the holding and sealing mat material 91 is made of inorganic fibers formed in filaments and having a small specific gravity. Accordingly, at a time of assembling the holding and sealing mat material 91 in the catalyst carrier 1 and the shell 95, there is a risk that a part of the inorganic fibers flies in all directions in the air from a surface of the holding and sealing mat material 91. Therefore, there is a risk of deteriorating a working environment of a working area for performing the assembling work, and for example, it is necessary for a worker to work with wearing an antidust mask or the like, at a time of performing the assembling.

In view of conventional problems, an object of the present invention is to provide a holding and sealing mat material of a catalytic converter for purifying an exhaust gas which can prevent the inorganic fibers from flying in all directions from a surface of the holding and sealing mat material and can keep a working environment at a time of assembling good.

DISCLOSURE OF THE INVENTION

According to an aspect of the invention, there is provided a holding and sealing mat material of a catalytic converter for purifying an exhaust gas, which is arranged between a catalyst carrier and a shell covering the catalyst carrier from the outside thereof, the holding and sealing mat material, comprising: a mat-like material which consists of inorganic fibers and is formed in a mat shape, and a binder of 0.5 to 20 weight % of an organic binder or an inorganic binder, which is attached to the mat-like material; wherein a filling bulk density of the holding and sealing mat material after being assembled is within a range between 0.1 and 0.6 g/cm³, and wherein in the case of estimating distribution rates of solids constituents in the binder attached to the mat-like material by dividing the mat-like material into three equal parts of an upper portion, a middle portion and a lower portion in a thickness direction, the distribution rates of the upper portion and the lower portion are higher than that of the middle portion.

A most remarkable matter in the present invention is that in the case of estimating the distribution rates of the solids constituents in the binder in the manner, the distribution rates in the upper portion and the lower portion are higher than that of the middle portion.

In this case, 0.5 to 20 weight % of a binder means a percentage content of the binder in a whole of the mat-like material.

Next, a description will be given to an operation and effect of the present invention.

In the present invention, the binder is intensively attached to the upper portion and the lower portion which correspond to exposed portions of the holding and sealing mat material. That is, the surface exposed to the outside in the holding and sealing mat material is covered by the solids constituents of the binder. Therefore, it is possible to prevent the inorganic fibers which are formed in filaments and have the small specific gravity from flying in all directions in the air from the surface of the holding and sealing mat material. Accordingly, since the inorganic fibers hardly fly in all directions at a time of assembling the holding and sealing mat material in the catalyst carrier and the shell, the worker can comfortably work without wearing the antidust mask or the like. Therefore, it is possible to keep the working environment in the working area for performing the assembling work good.

MODE FOR CARRYING OUT THE INVENTION

Figure 1:
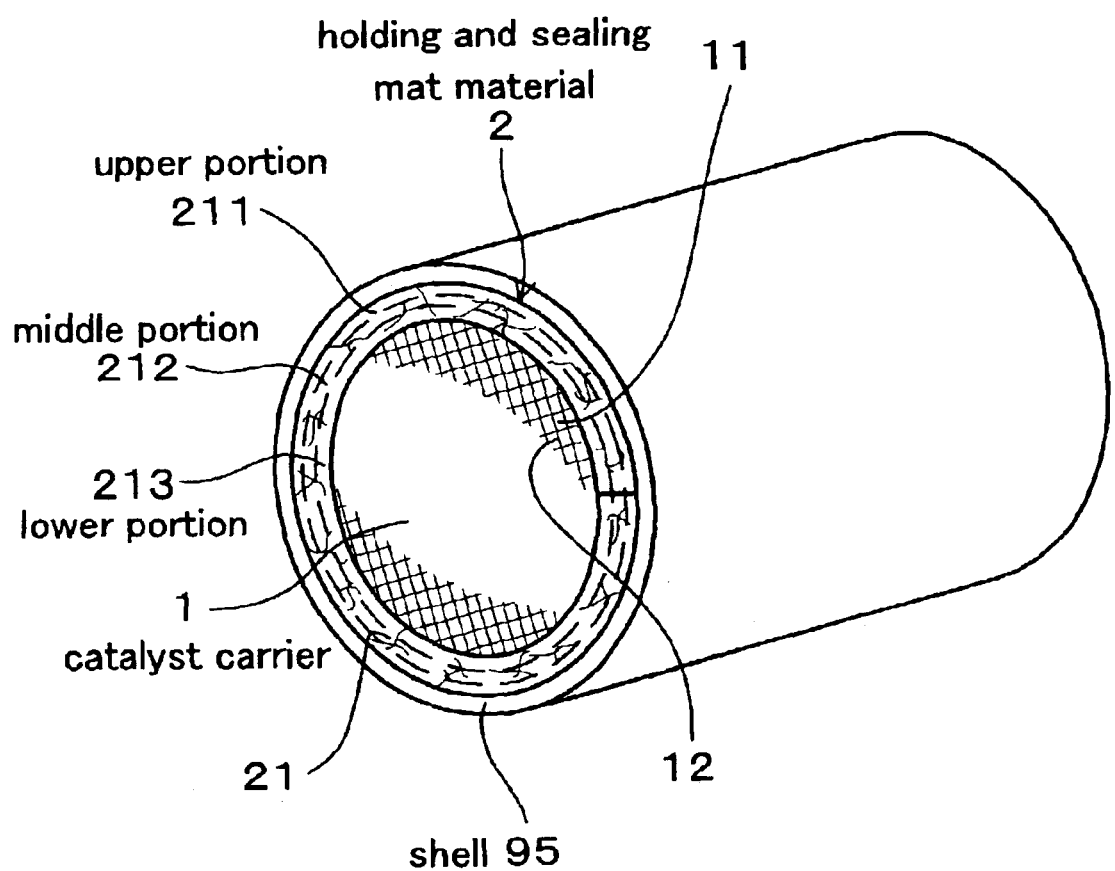
FIG. 1 is a perspective view which shows a state of assembling a holding and sealing mat material in a catalyst carrier and a shell, in accordance with an embodiment 1.
Figure 2A:
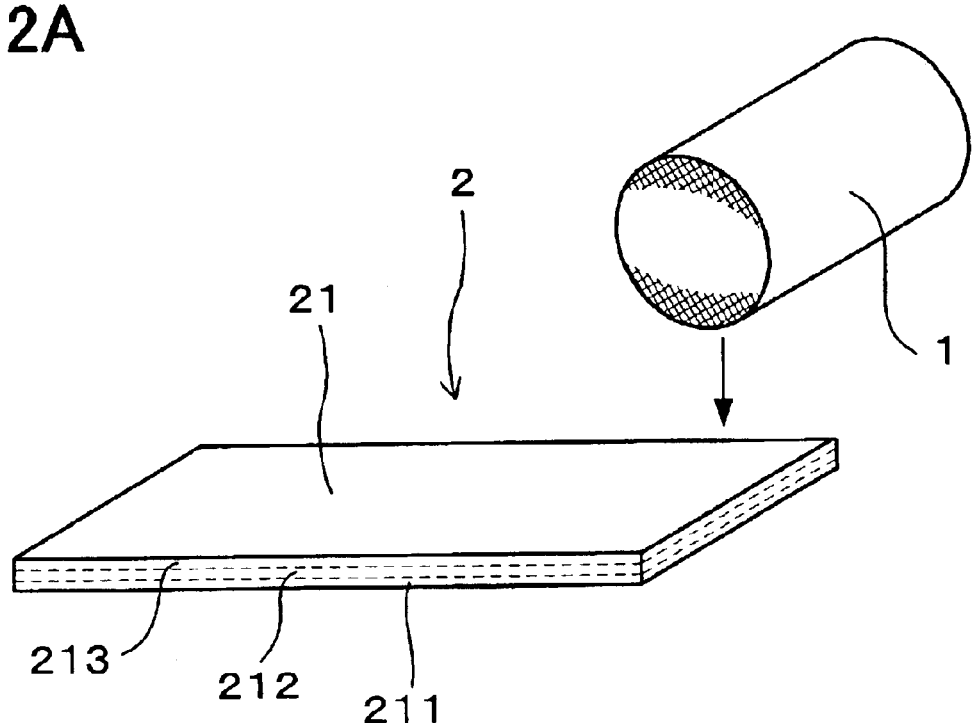
FIG. 2A is a perspective view which shows a state prior to winding the holding and sealing mat material around the catalyst carrier, in accordance with the embodiment 1.
Figure 2B:
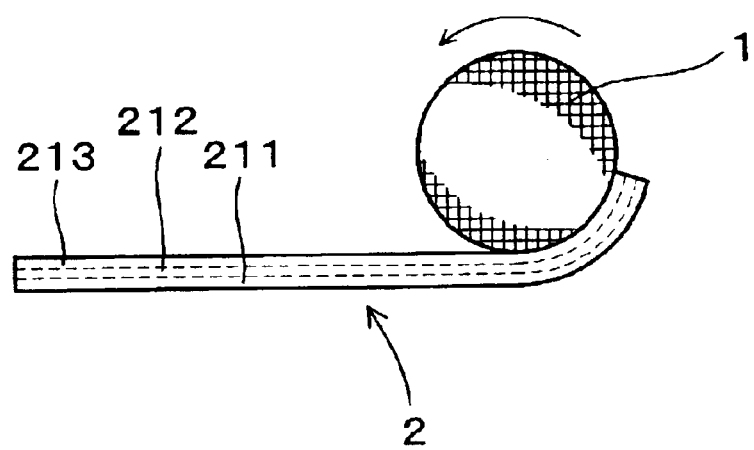
FIG. 2B is a perspective view which shows a state of winding the holding and sealing mat material around the catalyst carrier, in accordance with the embodiment 1.

In the present invention, in the case that the percentage content of the binder is less than 0.5 weight %, it is impossible to prevent the inorganic fibers from flying in all directions. On the other hand, in the case that the percentage contents of the binder is more than 20 weight %, defective points are different between a case that an organic binder is used for the binder and a case that an inorganic binder is used for the binder, that is, in the case of using the organic binder, there is a risk that the binder acts as an organic gas and is mixed with the exhaust gas at a time of assembling the holding and sealing mat material in the catalyst carrier and the shell so as to use as the catalytic converter for purifying an exhaust gas, thereby increasing a concentration of the exhaust gas, and in the case of using the inorganic binder, a flexibility of the holding and sealing mat material is lowered, and it is hard to assemble the holding and sealing mat material in the catalyst carrier.

Further, in the case that the filling bulk density after assembling the holding and sealing mat material is less than 0.1 g/cm$^3$, a contact pressure between the holding and sealing mat material and the catalyst carrier or between the holding and sealing mat material and the shell becomes small after assembling the holding and sealing mat material, and there is a risk that they displace in an axial direction. On the other hand, in the case that the filling bulk density is more than 0.6 g/cm$^3$, an amount of crushing the holding and sealing mat material become great at the time of performing the assembly, and there is a risk of collapsing the holding and sealing mat material and deteriorating a durability of the holding and sealing mat material.

The distribution rates of the solids constituents in the binder are preferably 35 to 50 weight % in the upper portion, 0 to 30 weight % in the middle portion, and 35 to 50 weight % in the lower portion. Accordingly, it is possible to easily prevent the inorganic fibers from flying in all directions from the surface of the holding and sealing mat material.

Here, in the case that the distribution rates of the upper portion and the lower portion are less than 35 weight %, the solids constituents of the binder are not sufficiently attached to the surface of the holding and sealing mat material, and there is a risk that it is impossible to sufficiently prevent the inorganic fibers of the holding and sealing mat material from flying in all directions in the air from the surface thereof.

On the other hand, in the case that the distribution rate in either the upper portion or the lower portion is more than 50 weight %, and in the case that the distribution rate of the middle portion is more than 30 weight %, the distribution of the solids constituent in the binder deflects to the upper portion or the lower portion, and there is a risk that it is impossible to sufficiently prevent the inorganic fibers of the holding and sealing mat material from flying in all directions in the air from the surface thereof.

It is preferable that the inorganic fibers constituting the mat-like material include one kind or two or more kinds of fibers selected from a group of a crystalline alumina fiber, an alumina-silica fiber and a silica fiber. Accordingly, it is possible to securely prevent the inorganic fibers from flying in all directions from the surface of the holding and sealing mat material.

In the holding and sealing mat material, it is preferable that a rate of weight decrease after executing a drop test of dropping ten times from a height of 500 mm is equal to or less than 0.2 weight %. Accordingly, it is possible to securely prevent the inorganic fibers from flying in all directions from the surface of the holding and sealing mat material.

In this case, the rate of weight decrease $\alpha$[%] is a quantity which can be expressed by a formula $\alpha=((W0-W)/W0)\times 100$ [%] in which the weight of the holding and sealing mat material before dropping is set as $W0$, and the weight of the holding and sealing mat material after dropping is set as W.

Thereinafter, a further detailed description will be given to the present invention by employing an embodiment, however the present invention is not limited to this embodiment.

Embodiment 1

A description will be given to the holding and sealing mat material of the catalytic converter for purifying an exhaust gas in accordance with the embodiment of the present invention with reference to FIGS. 1 to 5.

As shown in FIG. 1, a holding and sealing mat material 2 in the present embodiment is used in a state of being arranged between a catalyst carrier 1 and a shell 95 covering the catalyst carrier 1 from the outside thereof in a catalytic converter 10 for purifying an exhaust gas. Further, the holding and sealing mat material 2 is formed by attaching a binder consisting of 0.5 to 20 weight % of an organic binder or an inorganic binder to a mat-like material 21 (refer to FIGS. 2A and 2B) which consists of inorganic fibers and is formed in a mat shape, and is regulated so that a filling bulk density after being assembled is within a range between 0.1 and 0.6 g/cm$^3$.

Further, the holding and sealing mat material 2 is so configured that in the case of estimating distribution rates of solids constituents in the binder attached to the mat-like material 21 by dividing into three equal parts of an upper portion 211, a middle portion 212 and a lower portion 213 in a thickness direction of the mat-like material 21, the distribution rates in the upper portion 211 and the lower portion 213 are higher than that of the middle portion 212.

In particular, the filling bulk density of the holding and sealing mat material 2 after being assembled is set at 0.5 g/cm$^3$, and the thickness of the mat-like material 21 before being assembled is set at 25 mm. Further, the distribution rates of the binder are set at 45 weight % in the upper portion, 10 weight % in the middle portion and 45 weight % in the lower portion.

Thereinafter, a detailed description will be given to the above structure.

The catalyst carrier 1 employs a cordierite carrier in which a transverse sectional surface is formed in a honeycomb shape. A lot of rectangular holes 11 are provided along an axial direction in this catalyst carrier 1. Further, a lot of honeycomb walls 12 corresponding to partition walls of the rectangular holes 11 are formed between the rectangular holes 11 (refer to FIG. 1). Further, a catalyst mainly composed of a platinum or a palladium is carried on the catalyst carrier 1.

Further, the inorganic fibers constituting the mat-like material 21 employ crystalline alumina fibers corresponding to non-expansible fibers arranged so as not to expand so much due to heat. Further, the binder employs an emulsion latex corresponding to an organic binder.

Next, a description will be given to a method of attaching the binder to the mat-like material 21.

First, a binder solution is sprayed to the surface of the mat-like material 21, and the binder is infiltrated from the surface. Then, the mat-like material 21 is thereafter dried, and the solids constituents of the binder are attached to the mat-like material 21. In the manner, the binder is attached. In this case, it is possible to adjust the percentage content of the binder in the upper portion, the middle portion and the lower portion of the mat-like material 21 by adjusting a strength of spraying the binder.

Next, a description will be given to an assembling method of the holding and sealing mat material 2.

First, the holding and sealing mat material 2 is formed by attaching the binder to the mat-like material 21. Meanwhile, the catalyst is carried on the catalyst carrier 1.

Figure 3:
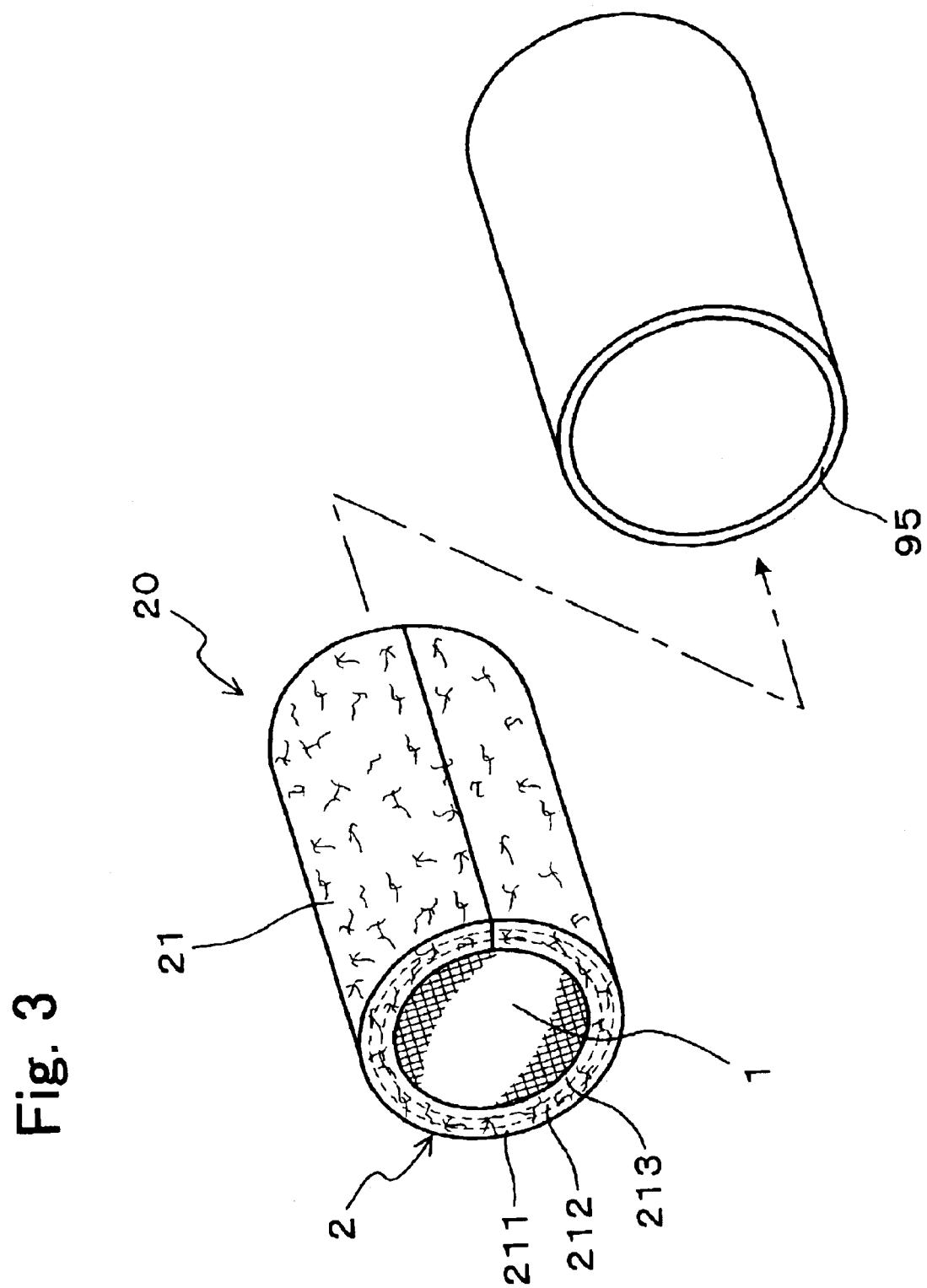
FIG. 3 is a perspective view which shows a state of arranging an integral product formed by winding the holding and sealing mat material around the catalyst carrier in the shell, in accordance with the embodiment 1.
Figure 4:
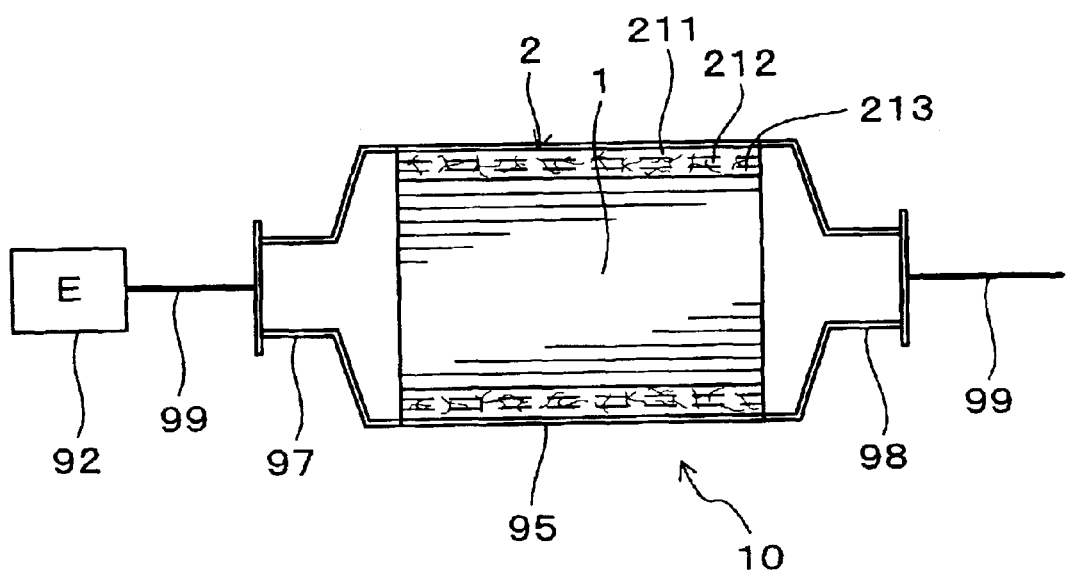
FIG. 4 is an explanation drawing which shows a state of arranging a catalytic converter for purifying an exhaust gas having the holding and sealing mat material assembled in the middle of an exhaust pipe of an engine, in accordance with the embodiment 1.

Next, the holding and sealing mat material 2 is wound around the catalyst carrier 1 so that an upper portion 211 of the holding and sealing mat material 2 is arranged outside (refer to FIGS. 2A and 2B), and an integrally wound product 20 is arranged in an inside of the shell 95 (refer to FIG. 3). In the manner, the holding and sealing mat material 2 is assembled, and an inlet connection portion 97 and an outlet connection portion 98 are respectively connected to both ends of the shell 95 by a welding process (refer to FIG. 4).

Further, the catalytic converter 10 for purifying an exhaust gas manufactured in the manner mentioned above is arranged in the middle of a pipe 99 for the exhaust gas discharged from an engine 92.

Figure 5:
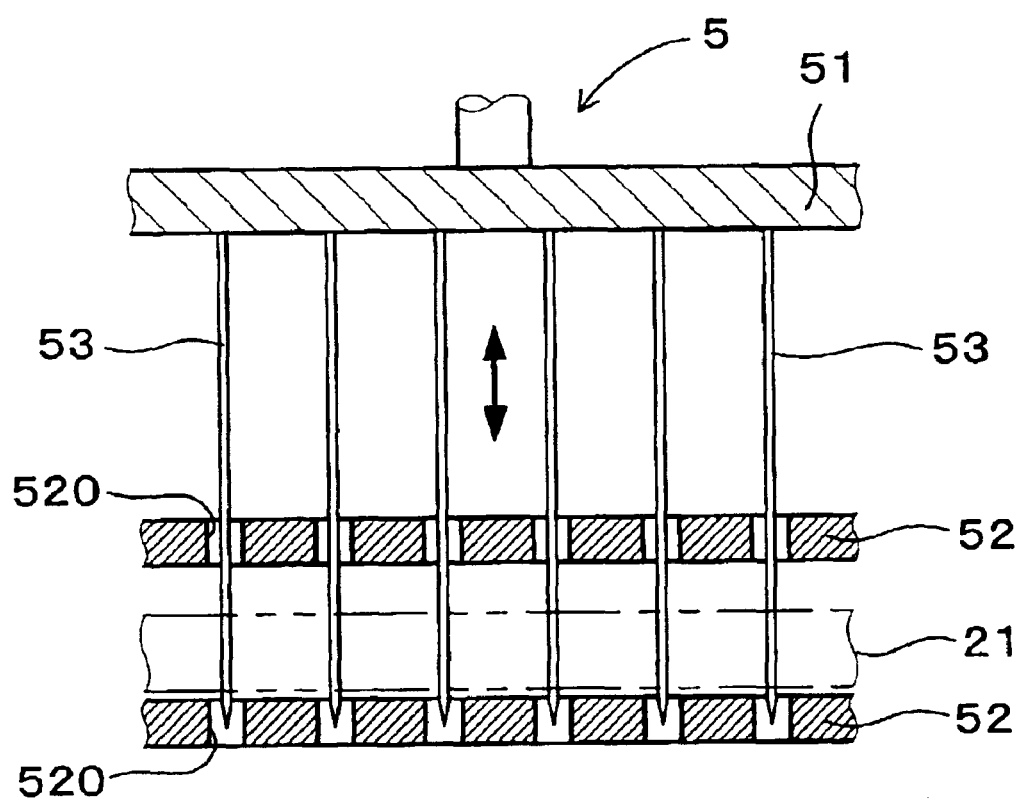
FIG. 5 is an explanation drawing which shows a needle-punching machine, in accordance with the embodiment 1.
Figure 6:
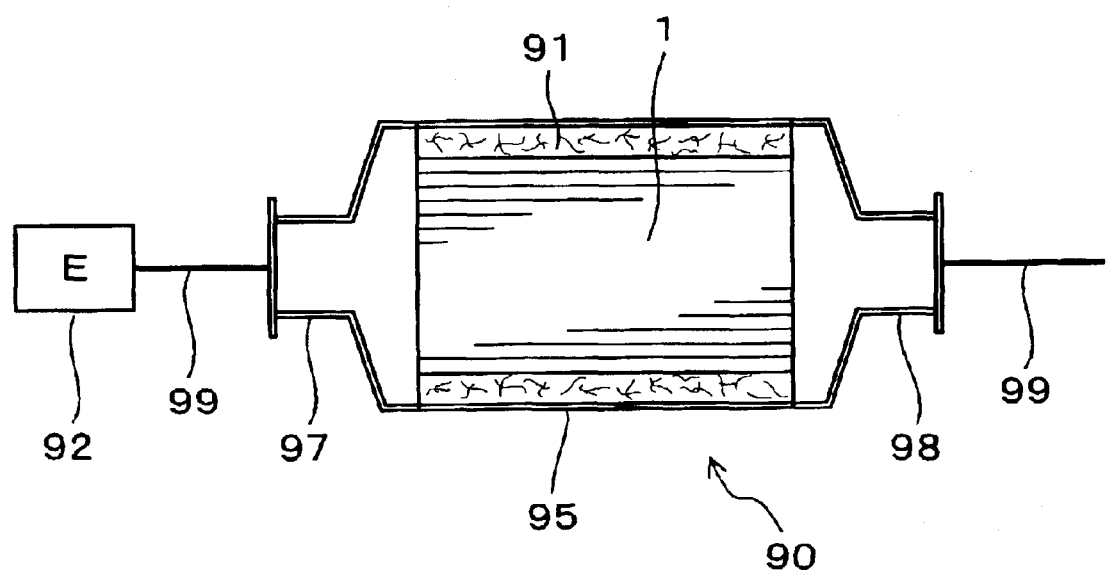
FIG. 6 is an explanation drawing which shows a state of arranging a catalytic converter for purifying an exhaust gas having a holding and sealing mat material assembled in the middle of the exhaust pipe of the engine, in accordance with a prior art.

In this case, as shown in FIG. 5, a needle punching process is applied to the mat-like material 21 prior to the attachment of the binder. The needle punching process is executed by a needle-punching machine 5 having a needle board 51 capable of reciprocating in the direction of piercing and a pair of support plates 52 which support both of front and back surfaces of the mat-like material 21 to which this process is applied.

A lot of needles 53 for piercing into the mat-like material 21 are fixed to the needle board 51. The needles 53 are fixed in a density that about 500 needles 53 exist in an area of 100 cm$^2$ of the needle board. Further, through holes 520 for the needles are provided in the support plates 52.

When the mat-like material 21 is passed between a pair of support plates 52 and the needle board 51 is reciprocated, the needles 53 are pierced into the mat-like material 21, and entanglements are formed between the inorganic fibers in the mat-like material 21.

Next, a description will be given to an operation and effect of the present embodiment.

In the present embodiment, the binder is intensively attached to the upper portion 211 and the lower portion 213 which correspond to the exposed portions of the holding and sealing mat material 2. That is, the surface exposed to the outside in the holding and sealing mat material 2 is covered by the solids constituents of the binder. Therefore, it is possible to prevent the inorganic fibers which are formed in filaments and have the small specific gravity from flying in all directions in the air from the surface of the holding and sealing mat material 2. Accordingly, since the inorganic fibers hardly fly in all directions at a time of assembling the holding and sealing mat material 2 in the catalyst carrier 1 and the shell 95, the worker can comfortably work without wearing the antidust mask or the like. Therefore, it is possible to keep the working environment in the working area for performing the assembling work good.

Further, the mat-like material 21 to which the needle punching is applied can be easily wound around the catalyst carrier 1 due to an improved flexibility, however, on the other hand, bent and short inorganic fibers are sometimes left on the surface of the mat-like material 21. Then, the left short inorganic fibers easily fly in all directions in the air at a time of assembling the mat-like material 21.

Accordingly, in the case of implementing the needle punching, it is possible to form the holding and sealing mat material 2 which is excellent in flexibility and can prevent the left short inorganic fibers from flying in all directions in the air, by attaching the binder to the mat-like material 21 in the manner.

Embodiment 2

In the present embodiment, in order to ascertain the fact that the inorganic fibers contained in the mat-like material 21 are hard to fly in all directions in the air, the following drop test is executed.

That is, in this drop test, using the mat-like material 21 (invention products 1 and 2) to which the different binders are attached and the mat-like material 21 (comparative product) to which no binder is attached, they are dropped down ten times from the height of 500 mm. Then, by checking out the rate of weight decrease of the mat-like material 21 after being dropped, it is estimated how hard the inorganic fibers in the mat-like material 21 are to fly in all directions in the air.

Invention Product 1

An emulsion latex as the binder is attached to the mat-like material 21 which is made of crystalline alumina fibers having a bulk density of 0.05 g/cm$^3$ and a thickness of 25 mm at 1 weight % as an amount in a whole of the mat-like material 21, in a free state prior to being assembled. Further, the distribution rates of this binder are set at 45 weight % in the upper portion, 10 weight % in the middle portion, and 45 weight % in the lower portion. Then, when the drop test is executed to the mat-like material 21 and the rate of weight decrease is measured, the rate of weight decrease is 0.002%.

In this case, the rate of weight decrease $\alpha[\%]$ is a quantity which can be expressed by the formula $\alpha=((W0-W)/W0)\times 100\,[\%]$ in which the weight of the mat-like material 21 prior to dropping is set as W0 and the weight of the mat-like material 21 after dropping is set as W.

Invention Product 2

Alumina sol as the binder is attached to the mat-like material 21 which is made of the same crystalline alumina fibers as the invention product 1 at 1 weight % as an amount in a whole of the mat-like material 21. The distribution rate of this binder is set at the same rate as the invention product 1. Then, when the drop test is executed to the mat-like material 21 and the rate of weight decrease is measured, the rate of weight decrease is 0.003%.

(Comparative Product)

The drop test is applied to the mat-like material 21 which is made of the same crystalline alumina fiber as the invention product 1, without attaching the binder to the mat-like material 21. Then, when the rate of weight decrease is measured, the rate of weight decrease is 0.312%.

As a result of executing the drop test in the manner, it is known that it is possible to significantly reduce the rate of weight decrease by intensively attaching the binder to the upper portion 211 and the lower portion 213 of the mat-like material 21 in the holding and sealing mat material 2. Further, it is known that if the rate of weight decrease is equal to or less than 0.2 weight %, it is possible to effectively prevent the inorganic fibers in the holding and sealing mat material 2 from flying in all directions in the air.

Industrial Applicability

As mentioned above, according to the present invention, it is possible to provide the holding and sealing mat material of the catalytic converter for purifying an exhaust gas which can prevent the inorganic fibers from flying in all directions from the surface and can keep the working environment at a time of assembling good.

What is claimed is:

1. A holding and sealing mat material of a catalytic converter for purifying an exhaust gas, which is arranged between a catalyst carrier and a shell covering the catalyst carrier from the outside thereof, the holding and sealing mat material, comprising:

a fiber material which is formed in a mat shape; and a binder which includes solids constituents and which is attached to the fiber material in an amount of 0.5 to 20% by weight of a whole of the fiber material, wherein a filling bulk density of the holding and sealing mat material after being assembled is within a range between 0.1 and 0.6 g/cm$^3$, the fiber material has an upper portion which is adjacent to the shell, a lower portion which is adjacent to the catalyst carrier, and a middle portion which is between the upper portion and the lower portion, each of which is one third of the fiber material in a thickness direction, and the solids constituents in the binder are distributed more in the upper portion and the lower portion than in the middle portion.

2. A holding and sealing mat material for a catalytic converter for purifying an exhaust gas as claimed in claim 1, wherein 35 to 50% by weight of the solids constituents in the binder are in the upper portion, 0 to 30% by weight of the solids constituents are in the middle portion, and 35 to 50% by weight of the solids constituents are in the lower portion.

3. A holding and sealing mat material for a catalytic converter for purifying an exhaust gas as claimed in claim 1, wherein the fiber material includes inorganic fibers.

4. A holding and sealing mat material for a catalytic converter for purifying an exhaust gas as claimed in claim 1, wherein a rate of weight decrease after executing a drop test of dropping ten times from a height of 500 mm is equal to or less than 0.2% by weight of the holding and sealing mat material.

5. A holding and sealing mat material for a catalytic converter for purifying an exhaust gas as claimed in claim 1, wherein the binder is an organic binder.

6. A holding and sealing mat material for a catalytic converter for purifying an exhaust gas as claimed in claim 1, wherein the binder is an organic binder.

7. A holding and sealing mat material for a catalytic converter for purifying an exhaust gas as claimed in claim 1, wherein a needle punching process is applied to the fiber material prior to attachment of the binder.

8. A holding and sealing mat material for a catalytic converter for purifying an exhaust gas as claimed in claim 3, wherein the inorganic fibers of the fiber material includes at least one kind of fibers selected from a group of a crystalline alumina fiber, an alumina-silica fiber and a silica fiber.

* * * * *

UNITED STATES PATENT AND TRADEMARK OFFICE
CERTIFICATE OF CORRECTION

PATENT NO. : 6,960,386 B2　　　　　　　　　　　　　　　　　　　　　　Page 1 of 1
DATED : November 1, 2005
INVENTOR(S) : Masanao Agata It is certified that error appears in the above-identified patent and that said Letters Patent is hereby corrected as shown below:

Column 8,
Line 11, change "wherein the binder is an organic binder" to -- wherein the binder is an inorganic binder --.

Signed and Sealed this

Eleventh Day of April, 2006

JON W. DUDAS
*Director of the United States Patent and Trademark Office*